United States Patent [19]

Bamford, deceased et al.

[11] 4,043,782
[45] Aug. 23, 1977

[54] METHOD OF AND APPARATUS FOR BENDING RELATIVELY THIN GLASS SHEETS

[75] Inventors: Robert P. Bamford, deceased, late of Toledo, Ohio, by Penelope R. Bamford, executrix; Richard A. Herrington, Walbridge; Waldemar W. Oelke, Rossford, both of Ohio

[73] Assignee: Libbey-Owens-Ford Company, Toledo, Ohio

[21] Appl. No.: 589,008

[22] Filed: June 23, 1975

[51] Int. Cl.² .......................................... C03B 27/00
[52] U.S. Cl. ...................................... 65/104; 65/273; 65/227
[58] Field of Search ................ 65/104, 106, 273, 275, 65/227

[56] References Cited

U.S. PATENT DOCUMENTS

| | | | |
|---|---|---|---|
| 3,265,484 | 8/1966 | Ritter, Jr. | 65/104 |
| 3,595,725 | 7/1971 | Coen | 65/104 X |
| 3,734,706 | 5/1973 | Ritter, Jr. | 65/104 |

Primary Examiner—Arthur D. Kellogg
Attorney, Agent, or Firm—Collins, Oberlin & Darr

[57] ABSTRACT

A method of and apparatus for bending and tempering a relatively thin glass sheet comprising heating the glass sheet to its softening point in a heating chamber, rapidly conveying the sheet from the heating chamber to and between a pair of mold press members for immediate press shaping therebetween, and then quickly chilling the sheets below the annealing temperature range of the glass in a two-stage operation by applying a cooling medium successively under relatively high and low pressures to the opposite surfaces of the sheet.

8 Claims, 3 Drawing Figures

11, and extending transversely across the chamber 22 with their opposite ends projecting through the opposite side walls 18 and suitably journalled in bearing blocks (not shown) located exteriorly of and along the side walls 18 of furnace 13.

The plurality of glass sheets are individually loaded on and supported in a generally horizontal plane on the longitudinally spaced conveyor rolls 23 at the entrance end of the furnace (not shown) and heated in a controlled manner to the desired bending temperature during their passage therethrough. Upon emerging through an opening 25 at the exit end of the furnace, the heated sheets S are transferred from conveyor rolls 23 onto a second series of spaced conveyor rolls 26, also part of the conveyor system 11 and which are located substantially within bending section 15. As shown in FIG. 1, the rolls 26 are smaller in diameter than the rolls 23 to define larger spaces therebetween for a purpose that will hereinafter become apparent. The series of rolls 26 support the glass sheets S horizontally for movement within the bending section 15 between a pair of complementary bending mold press members, hereinafter described, before and after bending, and then convey them into the primary tempering section 16.

In accordance with this invention, the bending means comprises an upper male mold member 30 and a lower female mold member 31 having opposed complemental shaping surfaces conforming to the desired curvature of the sheet to be bent. The mold members 30 and 31 are mounted for relative movement toward and away from each other on a structural frame 32, which includes a framework of vertically disposed columns 33 and horizontally extending beams 35 interconnected and tied together to form a rigid box-like structure. A base member 36 extends between the upright columns 33 adjacent their respective lower ends for supporting the female press member 31 and associated parts. The male mold member 30 is mounted above conveyor rolls 26 for vertical reciprocal movement relative to frame 32 while the female mold member 31 is located below the conveyor rolls 26 and mounted for vertical reciprocal movement toward and away from the male mold member 30.

A pair of laterally spaced locator stops 37 are positioned in the path of movement of the advancing glass sheets to interrupt movement thereof and accurately position the same in the desired location relative to press mold members 30 and 31. Each stop 37 is secured to the distal end of a piston rod 38 of a fluid actuating cylinder 40 mounted on a carriage 41. The cylinders 40 are operative to raise and lower the stops 37 between an upper position above conveyor rolls 26 in the path of movement of the glass sheets S and a lower position therebeneath.

The male mold member 30 conforms in outline to the glass sheets S to be bent and is provided with a downwardly directed, generally convex shaping surface 42 on the lower surface thereof to impart the desired curvature to the sheet. However, the particular outline of the mold 30, as well as the specific curvature of the shaping surface 42, is dictated by the shape of the glass sheet being bent and can vary widely, as desired.

The shaping surface 42 of mold member 30 can be covered with a sheet of suitable insulating cloth, such as woven or knit fiber glass for example, to provide a soft, non-abrasive surface in contact with the glass sheet to prevent marring of the latter and any fusion that might otherwise occur between the mold and the glass sheet.

The means for supporting the male mold member 30 on frame 32 includes a pair of actuating cylinders 43 (only one of which is shown in FIG. 1) mounted on the upper horizontal beams 35 and having suitable reciprocal pistons (not shown) provided with piston rods 45 connected at their outer ends to a vertically reciprocal platen frame 46. The male mold member 30 is connected to the platen frame 46 for movement therewith by means of interconnected structural members 47 and 48 and a support plate 50 extending transversely of the platen frame 46. A plurality of guide posts 51 are connected at their lower ends to the four corners of platen frame 46, respectively, and extend upwardly through suitable bushings 52 mounted on upper horizontal beams 35 for sliding movement relative thereto to properly guide platen frame 46 during its vertical reciprocal movement.

The female press member 31 is of an outline or ring-type construction and comprises a base plate 53 secured to the carriage 41 and a shaping rail 55 connected to base plate 53 in spaced relation thereto via a series of connecting rods 56. The shaping rail 55 conforms in outline to the glass sheets S to be bent and is provided on its upper face with a generally concave shaping surface 57 complementary to the male member shaping surface 42 in opposed relation thereto. In order to permit displacement of the female shaping rail 55 above the level of conveyor rolls 26 for lifting the glass sheets thereabove into pressing engagement against the male shaping surface 42, rail 55 is formed of a plurality of segments 58 (FIG. 2) spaced apart from each other a sufficient distance to pass between adjacent rolls 26 when raised and lowered. The diameter of rolls 26 is formed of a relatively smaller diameter than rolls 23 for the purpose of providing maximum clearance therebetween for the passage of the shaping rail segments 58 therethrough. Also, because a portion of the shaping rail 55 intersects one of the rolls at a slight acute angle, a reduced diameter portion 26a is formed in such roll to reduce the spacing between adjacent segments 58 at such intersection.

The carriage 41 is supported by a pair of guide members 60 (FIG. 1) and vertically movable by a fluid actuator 61 mounted on base member 36 and having a suitable piston rod 62 for raising and lowering the female press member 31 between its lower position beneath conveyor rolls 26 and its upper position thereabove for lifting a heated glass sheet S from the rolls 26 and pressing the same against the male mold member 30 between the respective complemental shaping surfaces 42 and 57, thus forming the glass sheet into the desired curvature. After bending, piston rod 62 is retracted to lower the female press member 31 below conveyor rolls 26 and deposit the bent sheet thereon for advancement into the tempering area.

In conventional horizontal glass bending and tempering processes, a flat sheet of glass is heated up to the softening point thereof in a furnace while advancing on conveyor rolls in a generally horizontal path therethrough. The heated sheet of glass exiting from the heating atmosphere continues to be advanced in such path until engaged by a pair of stops, which serve to align the sheet between opposed mold members. The lower mold member is then elevated and lifts the sheet off the conveyor rolls out of said path toward and against the upper mold member to press the glass sheet therebetween and impart the desired curvature to the sheet. The lower mold member remains temporarily in

METHOD OF AND APPARATUS FOR BENDING RELATIVELY THIN GLASS SHEETS

BACKGROUND OF THE INVENTION

The present invention relates generally to the production of curved, tempered sheets of glass and, more particularly, to an improved method of and apparatus for bending and heat treating relatively thin glass sheets.

Bent glass is widely used in glazing side openings in vehicles such as automobiles or the like and, to be suitable for such application, flat glass sheets or plates must be bent to precisely defined curvatures dictated by the overall styling of the vehicles and the manner of mounting the glass in the openings. At the same time it is important that the bent sheets meet stringent optical requirements and that the viewing area of the window or light be free of optical defects that would tend to interfere with the clear viewing therethrough. Further, bent glass sheets intended for use as glazing closures in vehicles are subjected to an additional heat treatment to temper the glass for strengthening the same and increasing the resistance thereof to damage resulting from impact.

In general, therefore, the commercial production of bent glass sheets for such purposes commonly includes heating flat sheets to the softening point of the glass, bending the heated sheets to a desired curvature and thereafter cooling the bent sheets in a controlled manner to a temperature below the annealing range of the glass.

For reasons of efficiency and to permit their being handled in large quantities, the sheets are conventionally heated, bent and cooled while being moved almost continuously along a fixed path and successively through a heating area, a bending area and a cooling area. To achieve satisfactory temper, the temperature of the glass sheet must be above a predetermined minimum level so as to maintain the core or interior thereof above a deformation temperature upon being exposed to the tempering medium. The residual heat remaining in glass sheets of conventional thicknesses, such as those having thicknesses ranging from 0.180 inch to 0.255 inch for example, is generally above such predetermined minimal level after bending for immediate advancement to the tempering area and exposure to the tempering medium. Thus, the heat initially imparted to the sheet to bring it to proper bending temperature can also be utilized in the final heat treating operation.

However, within the last several years, considerable emphasis has been placed on the use of thinner and thinner glass sheets for automotive glazing purposes. This has posed problems in bending and tempering, due to the lesser ability of the thinner sheets to retain heat and the aforementioned conventional process of bending and treating glass sheets does not lend itself to the processing of these relatively thin sheets, such as those having thicknesses ranging from 0.090 to 0.156 inch for example. As the thickness of the glass decreases, the rate of heat loss increases and the heat initially imparted to such thin sheets is quickly dissipated upon leaving the heating atmosphere of the furnace and during the relatively cool bending cycle. Attempts to solve these problems by initially overheating the thin sheets have not been successful because of the consequent loss of deformation control and the degradation of the surface quality of the finished glass as a result of heat stains, rolls distortion, pitting and the like.

SUMMARY OF THE INVENTION

Accordingly, a primary object of the present invention is to overcome the above shortcomings by providing a new and improved method of and apparatus for bending and heat treating relatively thin sheets of glass.

Another object of this invention is the provision in such a method and apparatus of a compact, end-to-end arrangement of the heating, bending, and tempering sections, together with high speed glass conveyance, to drastically reduce draw time to a minimum.

Still another object of the present invention is to provide in the foregoing method and apparatus a high and low pressure, two-stage tempering operation.

The foregoing and other objects, advantages and characterizing features of the present invention will become clearly apparent from the ensuing detailed description thereof considered in conjunction with the accompanying drawings wherein like reference numerals denote like parts throughout the various views.

DESCRIPTION OF THE PREFERRED EMBODIMENT

Figure 1:
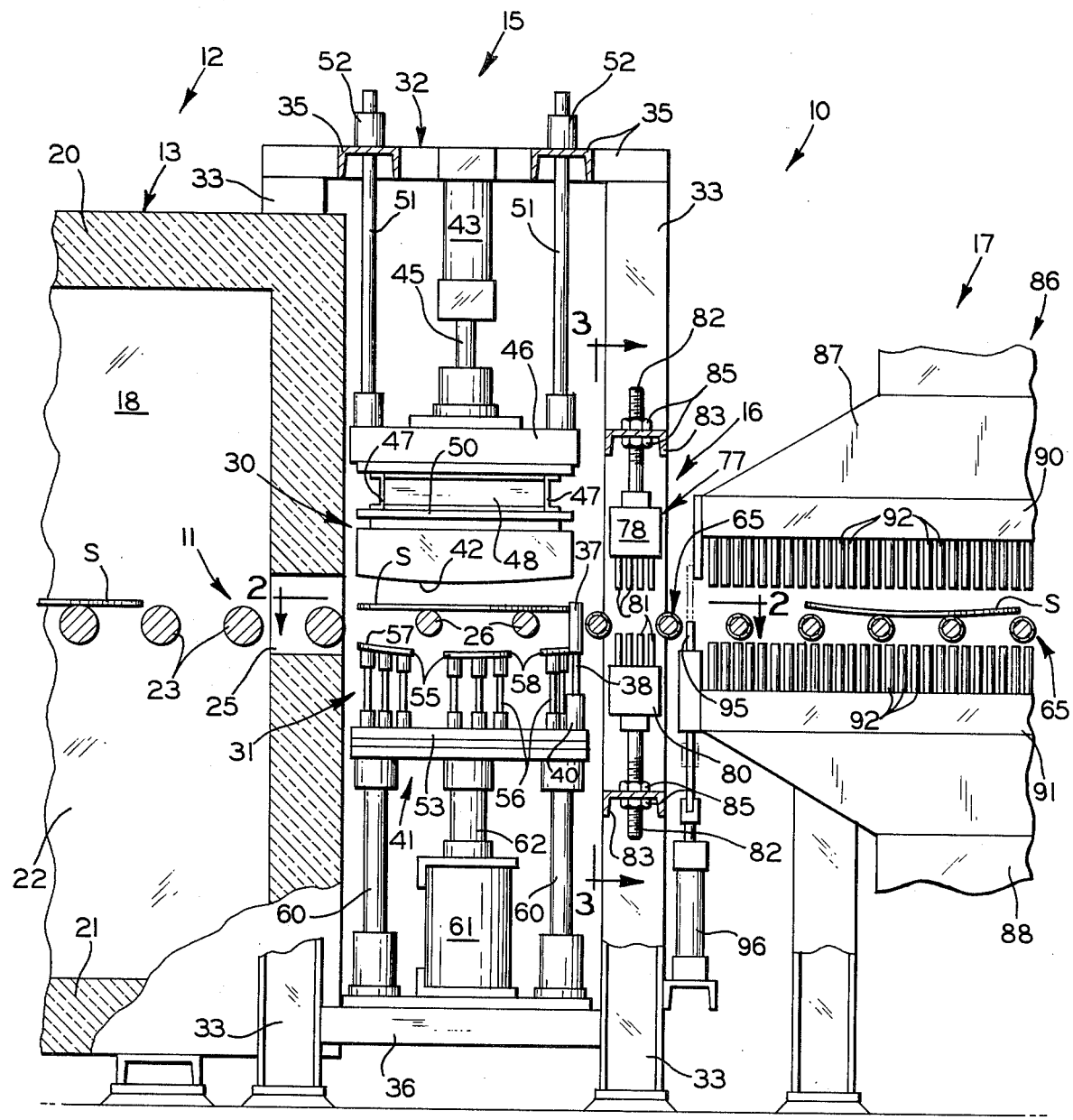
FIG. 1 is a side elevational view of a bending and tempering apparatus constructed in accordance with this invention and with parts of the heating and tempering sections broken away.

Referring now in detail to the illustrative embodiment depicted in the accompanying drawings, there is shown in FIG. 1 a glass sheet bending and tempering apparatus comprehensively designated 10, which includes a continuous conveyor system 11 adapted to support a plurality of sheets S in a generally horizontal plane for movement along a continuous, substantially horizontal path through a heating section 12 having a furnace 13 for heating the sheets to their softening point or bending temperature, a bending section 15 having means for bending the heated sheets S to the desired curvature, a first tempering section 16, and a second tempering section 17 cooperative in a two-stage operation for rapidly reducing the temperature of the bent sheets to produce the desired temper therein. It should be appreciated that the oblong sheets are positioned on the conveyor system 11 in a manner orienting their respective long dimensions in a direction normal to the path of travel i.e., parallel to the axes of the conveyor rolls forming the system 11. Such an orientation facilitates the rapid processing of the sheets through the bending cycle as will hereinafter be more fully explained.

In the illustrated embodiment, the glass sheets are heated in the furnace 13 which is of the tunnel-type having side walls 18, a top wall 20 and a bottom wall 21 defining a heating chamber 22. The heating chamber 22 can be heated in any desired manner by suitable heating means, such as gas burners or electrical resistance elements for example (not shown), located at the top and side walls of the furnace 13. Such heating means are suitably controlled by apparatus (also not shown) to obtain the desired temperatures at various points in heating chamber 22. The sheets S are carried through the heating chamber 22 of the furnace on a plurality of conveyor rolls 23, forming part of the conveyor system its uppermost bending position, commonly referred to as the No. 1 dwell position, to assure complete press shaping of the sheet. After this momentary dwell, the lower mold is lowered and temporarily halted in an intermediate position, known as the No. 2 dwell position, whereat the sheet is cooled either by the cooler ambient atmosphere of the bending area or by cooling fluid positively applied against the opposite surfaces of the bent sheet to set or "freeze" the skin thereof and resist deformation when subsequently deposited on the conveyor rolls. After this No. 2 dwell, the lower mold is further lowered below the conveyor rolls to deposit the bent sheet thereon for further advancement in the original horizontal path to and through a chilling area where the bent sheet is tempered.

Attempts to process relatively thin glass sheets in the manner described above poses problems because of the rapid rate of heat loss in such thin sheets, the rate of heat loss increasing as the thickness of the glass decreases. Thus, the initial heat imparted to the thin sheets is quickly dissipated once removed from the heating atmosphere. The "draw" time, i.e., from the time that a given sheet leaves the heating furnace and is fully within the tempering area, normally ranges from 6 to 10 seconds. This draw time, together with the heat transfer resulting from the engagement of the hot sheet with the relatively cool press molds, further compounds the problem of retaining the prerequisite heat in thin sheets necessary for proper tempering. In an effort to compensate for such heat losses in relatively thin glass, attempts have been made to overheat these thin sheets during initial heating to insure an adequate temperature for quality tempering. However, processing relatively thin sheets at high or extreme temperatures results in a loss of deformation control and also tends to degrade the optical surface qualities of the finished product due to the possibility of the hot sheets sticking to the conveyor rolls, the likelihood of roll surface imperfections being imparted to the glass sheet surfaces, and the possible sagging of portions of the sheet between the rolls. Thus, it can be readily appreciated that the bending and tempering of relatively thin glass sheets in a horizontal press bending operation poses serious problems.

In order to overcome the shortcomings noted above, the present invention contemplates drastically reducing the draw time between heating and tempering to maintain the relatively thin glass sheets above the minimum temperature necessary for tempering while enabling such sheets to be processed at cooler temperatures than could otherwise be done when processed in accordance with known techniques. To this end, the press bending mold members 30 and 31 are interposed immediately adjacent the exit end of furnace 13 and the entrance end of primary tempering section 16 for quick transferal of a heated sheet therebetween. Also, the conveyor rolls are selectively driven at high rates of linear speeds to further promote rapid transferal between these sections. Moreover, the lower press mold 31 is responsive to proper positioning of the glass for immediate actuation to raise the sheet to effect bending quickly with a minimal No. 1 dwell duration, and lower the same continuously without interruption in order to deposit the bent sheet on the conveyor rolls for rapid advancement into the first or primary tempering section 16. Thus, the end-to-end arrangement of the heating, bending and first tempering sections in a compact, juxtaposed relation, coupled with the high speed glass conveyance therebetween, promotes rapid processing of the sheet through the bending cycle to significantly reduce draw time.

When lowered after bending, the female mold member 31 is not interrupted in an intermediate No. 2 dwell position, but continues to descend until it reaches the end of its downstroke. Because the thin sheet is processed colder than otherwise would be required under the above described conventional process, the No. 2 dwell interruption can be entirely eliminated without the likelihood of deformation and other imperfections being imparted to the glass sheet by the conveyor rolls. Moreover, the engagement of the sheet with the relatively cool male mold member 30 creates a sufficient set or freeze of the glass surfaces to maintain the shape imparted thereto when subsequently deposited on the conveyor rolls.

Figure 3:
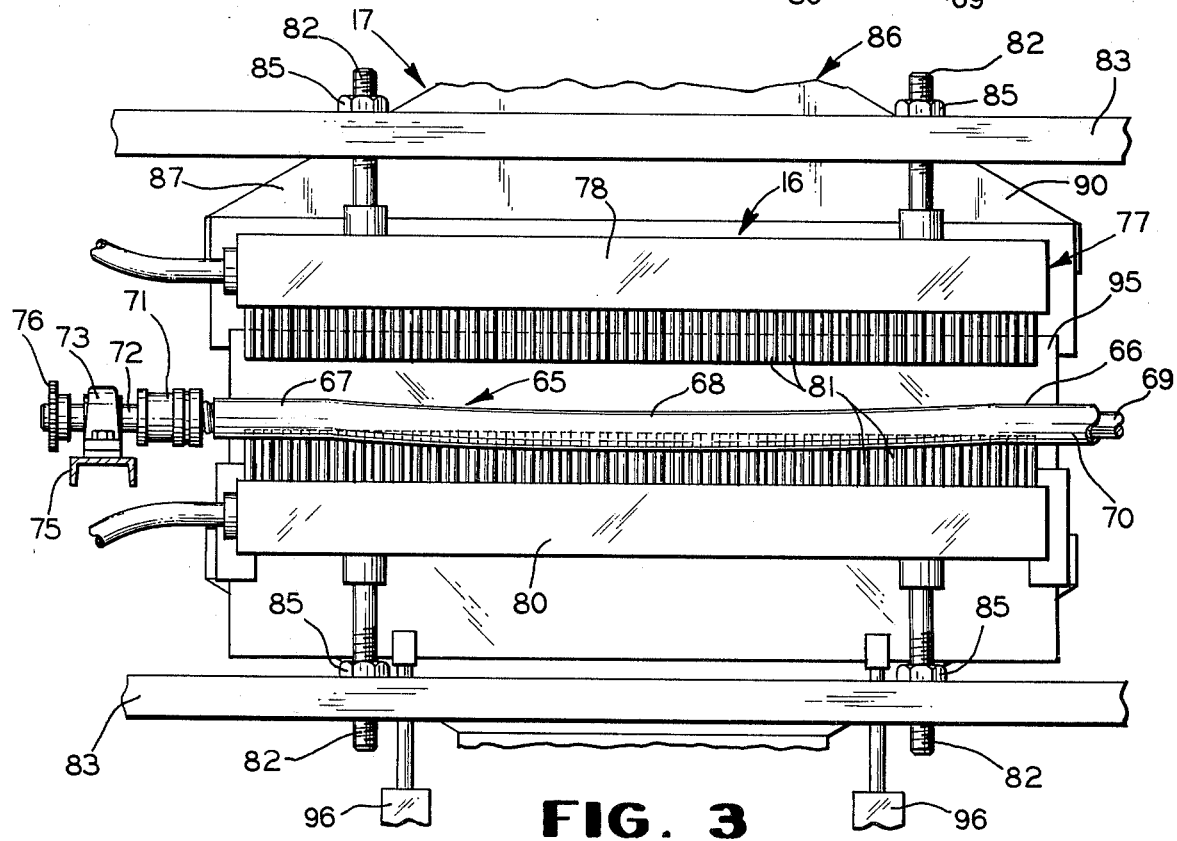
FIG. 3 is a vertical sectional view, on an enlarged scale, taken along line 3—3 of FIG. 1.

Upon being deposited on conveyor rolls 26, the bent sheet is immediately transferred onto a third series of conveyor rolls 65, also a part of the conveyor system 11, and rapidly advanced into and through the primary and secondary tempering sections 16 and 17, hereinafter more fully described. Each conveyor roll 65 comprises straight opposite end portions 66 and 67 (FIG. 3) joined together by a slightly curved, central portion 68 which conforms generally to the transverse curvature imparted to the sheet. The roll 65 is formed of an inner flexible stationary core member 69 and an outer, flexible, load carrying, rotatable sleeve 70 capable of transmitting torque without significant axial twist or distortion. The sleeve 70 can be covered with an asbestos or fiber glass material to provide a soft, heat resistant, non-marring surface upon which the bent glass sheets are received. The opposite ends of sleeves 70 are mounted in rotatable collars 71 (only one of which is shown in FIG. 3) having extensions 72 journalled for rotation in suitable bearings 73 carried on rails 75 extending longitudinally along opposite sides of the tempering apparatus. Extensions 72 are provided with sprockets 76 about which an endless drive chain (not shown) is trained for rotating the conveyor rolls 65 in unison about their chordal axes.

As is well known in the tempering art, it is necessary to maintain the glass sheets at or above the core deformation or softening point when suddenly chilled to place the outer surface thereof under compression and the interior under tension. In the illustrated embodiment of the present invention, this sudden chilling is effected by flushing the opposed surfaces of the glass sheet with a continuous supply of cooling medium, preferably gases. For this purpose, the first tempering section 16 is located immediately adjacent the mold members 30 and 31 and generally within the bending area to reduce the transfer time therebetween to a minimum. Moreover, as will hereinafter become apparent, the cooling gases are delivered through relatively small I.D. tubes at relatively high pressures, but at a relatively low volume, to provide continuously flowing, fresh cooling air for dramatically increasing the rate of cooling of the glass surfaces without being restricted at the glass surfaces as might otherwise occur with relatively large volumes of air flow. Moreover, supplying this high pressure air at a relatively low volume minimizes "blow back" into the press area.

Figure 2:
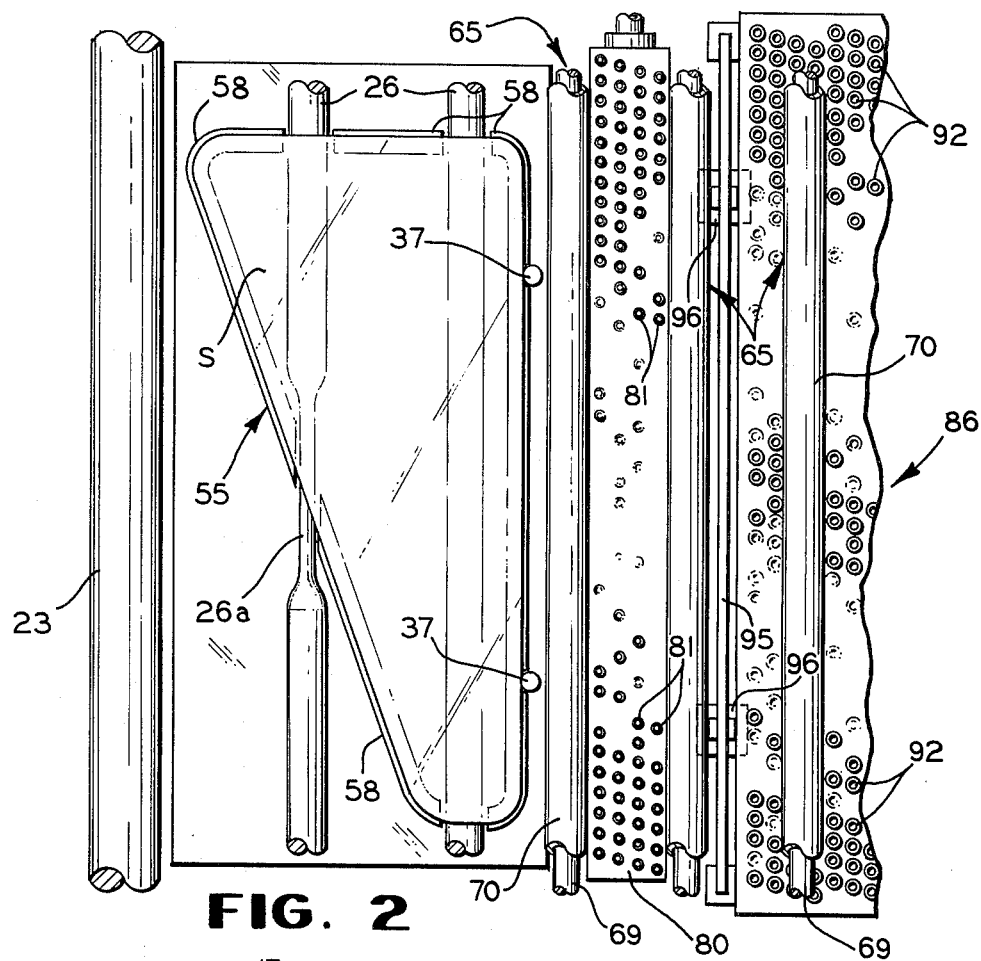
FIG. 2 is a plan view, on an enlarged scale, taken along line 2—2 of FIG. 1.

The primary tempering section 16 consists of quenching or chilling means 77 comprising upper and lower blastheads having manifolds 78 and 80 extending transversely across the path of movement of the sheets S and connected to a suitable source (not shown) of cooling medium maintained under a relatively high pressure, the cooling medium being air in the illustrated embodiment. Each of the manifolds 78, 80 is provided with a plurality of tubes 81 for discharging streams of cooling air toward the opposite surfaces of the bent sheets S moving along a horizontal path. As best seen in FIG. 2, the tubes 81 in each of the manifolds are arranged in spaced parallel rows with adjacent rows of tubes in a staggered relation providing an overlapping pattern to more evenly distribute the air across the surface of the glass sheet. Thus, as a bent sheet is returned to conveyor rolls 26, it is immediately transferred to rolls 65 and advanced between the upper and lower manifolds 78 and 80 and flushed with cooling air delivered at relatively high pressures for initiating the tempering action at a high rate of cooling while the sheet still possesses the necessary heat for tempering. These high pressure streams produce a constantly flowing stream of cooling air at the sheet surfaces to rapidly reduce the temperature thereof. Also, by utilizing air in the first tempering section at comparatively high pressures, the size of the manifolds required to deliver this high pressure air can be restricted measurably to locate the same within the rear end of the bending area and thereby further reduce the draw time of the sheet being processed.

The upper and lower manifolds 78 and 80 are secured, as by means of a plurality of threaded studs 82, to transversely extending structural members 83 connected at their opposite ends to the vertical columns 33. The threaded studs 82 afford vertical adjustment of the manifolds and are fixed in the selective adjusted position by means of lock nuts 85 threaded thereon on opposite sides of the structural members 83.

The tempering section 17 is located closely adjacent section 16 and consists of a quenching or chilling means 86 including opposed upper and lower blastheads 87 and 88 extending along the path of the moving sheets and connected to a source (not shown) of cooling air under relatively low pressures. The blastheads 87 and 88 are provided with plenum chambers 90 and 91 which extends transversely of the path of the moving sheets. Each plenum chamber 90, 91 is provided with a plurality of tubes 92 for discharging streams of cooling air under relatively low pressures, but relatively large volumes, flowing outwardly of the plenum chambers toward the opposite surfaces of the sheets moving along the path.

Since the blastheads 90 and 91 are continuously operative and produce relatively large volumes of air, a slidable gate 95 is located at the entrance end thereof to prevent "blow back" of the cooling air from the blastheads. The gate 95 is movable vertically between an open position shown in full lines and a closed position shown in dotted lines in FIG. 1 by means of actuating cylinders 96 automatically operable to open the gate 95 just prior to the entry of a glass sheet into the secondary tempering station 17 and to close the gate 95 immediately after the sheet is completely contained therein.

The mode of operation of the apparatus of this invention in bending and tempering one sheet of glass is as follows:

A flat glass sheet S is loaded onto the conveyor rolls 23 at the entrance end (not shown) of the furnace 13 for movement through the heating chamber 22 wherein the sheet is heated to substantially its softening point or bending temperature. This heated sheet passes through the opening 25 and is transferred onto conveyor rolls 26 for rapid movement into the bending station 15 between the male and female mold members 30 and 31.

As the sheet enters the bending section 15 i.e., just about the time the leading edge of the advancing sheet leaves furnace 13, a photoelectric cell or other suitable detection device (not shown) activates a timer controlling the speed of conveyor rolls 26 and the last few rolls 23 adjacent the exit end of chamber 22 to increase the speed thereof for rapidly advancing the sheet out of the furnace and into the bending area. This is desirable in minimizing the heat loss dissipated to the ambient atmosphere. As the leading edge of the sheet approaches locator stops 37 and comes within close proximity thereto, the timer becomes effective to decelerate the speed of these rolls and slow down the advancement of the sheet. It should be appreciated that the drive means for rotating the conveyor rolls are well known and it is believed that no detailed description thereof is necessary. The speed differential of these last few rolls 23 and rolls 26 is automatically controlled by the above mentioned timer, which is responsive to the above referred to photoelectric cell or other detection device.

The same detection device, or, if desired, another slightly downstream therefrom, initiates actuation of a timer (not shown) controlling operation of the bending cycle. The timing of this latter control is such that cylinder 61 is actuated to raise the female press member 31 upwardly to remove the sheet from the conveyor rolls 26 just about the time the leading edge of the sheet engages stops 37. The press member 31 continues upwardly to press the sheet against the male press member 30 and bend sheet S to the desired shaped. During the upstroke of the female press member 31, cylinders 40 are actuated to retract the locator stops 37 to permit advancement of the bent sheet when subsequently returned to conveyor rolls 26.

After a brief dwell period in which the glass sheet S is pressed into the desired curvature, the female press member 31 is lowered without interruption below conveyor rolls 26 to deposit the bent sheet thereon. The rolls 26 receive the bent sheet and advance the same out of the bending section 15 and onto the successive contoured supporting surfaces of the conveyor rolls 65. The bent sheet is advanced on conveyor rolls 65 between the opposed tubes 81 of the high pressure blasthead manifolds 78 and 80, which direct streams of cooling fluid under relatively high pressures, on the order of 5-18 p.s.i. for example, to produce relatively small, but efficient cooling, volumes of air impinging against the opposite surfaces of the sheet to promote a rapid rate of cooling and thereby obtain a quality temper in the sheet. Preferably, the pressure of the cooling fluid directed against the upper surface of the sheet is greater than the pressure of the cooling fluid directed against the lower or bottom surface of the sheet to lightly maintain the sheet on the roll without "drifting" or floating of the sheet. The flow of this high pressure air is controlled by a quick acting on-off switch (not shown), which is activated at the end of the press cycle before the glass is admitted between manifolds 78 and 80. The switch energizes a "quench" timer (also not shown) which maintains the high pressure flow on until it times out and de-activates the switch when the trailing edge of the sheet leaves tempering section 16. As the leading edge of the bent sheet approaches tempering section 17, cylinders 96 become operative via a suitable sensing device to retract and open gate 95 permitting entry of the sheet into tempering section 17 between blastheads 87 and 88 wherein the sheet continues to be tempered by the impingement of cooling air thereagainst under relatively low pressures, ranging from about 1 to 3 p.s.i., via tubes 92 and plenum chambers 90 and 91.

The preferred process according to this invention has been tested in a continuous production operation for successfully bending glass sheets to the desired curvature and satisfactorily tempering the same to meet prticle size requirements when broken. The glass sheets formed by this process were of ⅛ inch thicknesses having a shape in plan such as that shown in FIG. 2 and the length of each sheet along its greatest dimension was about 30 inches. Each sheet was approximately 14 inches wide at its widest dimension and about 3.5 inches wide at the narrow end thereof. In the production run, the glass sheets were bent about a longitudinal line to form a transverse curvature having a rise of approximately ⅝ of an inch of the lateral marginal edges with respect to the center portion and about a transverse line to form a longitudinal curvature having a swept-up trailing edge projecting about ½ of an inch above the major portion or body of the sheet.

The glass sheets were successively moved, one by one, with their longitudinal dimensions parallel to the conveyor roll axes, through the furnace where they were heated to approximately 1100° F. The conveyor rolls 23 in furnace 13 were driven by a suitable power source (not shown) at a linear speed of about 260 inches per minute. The conveyor rolls 26 in the bending section and the last few rolls 23 adjacent the exit end of heating chamber 22 were adapted to be alternately driven at a high rate of linear speed on the order of 1462 inches per minute and a low rate of linear speed of about 420 inches per minute. The high speed rate was utilized to rapidly move the heated sheet from the heating chamber and into position between the mold press members 30 and 31. As the sheet approached its final position between the molds, the rolls were decelerated from such high speed rate to the low speed rate to bring the sheet at a retarded rate into final position at about the time the ascending lower press member 31 engaged such sheet. Female mold member 31 was raised quickly to remove the heated sheets from conveyor rolls 26 and move the same against the male mold member 30, the dwell period in the press shaping position having a duration of approximately 1 ⅝ seconds. After press shaping, the bent sheet was returned to the conveyor rolls 26 and advanced into the first tempering section at the lower rate of linear speed of 420 inches per second. Total draw time, i.e., from the time the glass sheet left the furnace until it was fully within the primary tempering sections 16 was 3.5 seconds, as contrasted with the 6–10 seconds otherwise required when bent according to conventional horizontal bending procedures. This minimal draw time enabled the glass sheets to retain sufficient heat maintaining the cores or interior portions thereof at deformation temperatures when exposed to the high pressure, small volume cooling air of the tempering section 16 to obtain an efficient rate of heat transfer yielding a quality temper. The engagement of the heated glass sheet with the relatively cool male mold member set or froze the surface skin of the sheet adequately to preserve the shape thereof and provide the requisite support when lowered on the conveyor rolls 26 for the time necessary to travel from the press area to the high pressure tempering section and still retain the necessary heat for satisfactory tempering.

The bending section 15 was made as compact as possible with the entrance end of the molds 30,31 located immediately adjacent the exit end of heating chamber 22. Likewise, the entrance end of the tempering section 16 was located immediately adjacent the exit end of the bending molds and virtually within the rear end of bending section 15 as shown in FIG. 1. The sheets being processed were conveyed and supported with their long dimensions extending substantially parallel to the conveyor rolls, i.e., normal to the path of movement, to reduce time in conveyance between sections and to facilitate shortening of the bending molds in the direction of sheet travel. This permitted the utility of bending molds occupying only about 20 inches of the production line, thus bringing the primary tempering section as close as possible to the heating furnace. This compact, juxtaposed, end-to-end arrangement of sections 12, 15 and 16 in a contiguous relation without any clearances or spaces therebetween, coupled with the high transferal speed of the glass from furnace to bending, significantly reduced the exposure time of the glass to the ambient atmosphere, enabling the relatively thin glass sheet to retain the requisite heat necessary for tempering without either initially overheating the thin sheet or reheating the same after bending.

In the primary tempering section 16, the upper blasthead consisted of a 6 inch wide manifold having tubes of 0.060 inch I.D. on ¾ inch centers with adjacent rows of tubes in staggered relation to provide a fourth row overlapping pattern. The top blasthead 78 discharged air at approximately 11 p.s.i. to produce approximately 2365 cubic feet of air, while the bottom blasthead 80 put out approximately 1168 cubic feet of air at about 5 p.s.i. The lower blasthead consisted of two 3 inch wide manifolds extending in a side-by-side relation.

In the secondary tempering section 17, the blastheads 87 and 88 were provided with ¼ inch I.D. tubes on ¾ inch tube-to-tube spacing with a fourth row overlap pattern. The upper blasthead 87 was operated at a pressure of 40 inches of water column (approximately 1.44 p.s.i.) while the lower blasthead 88 operated at a pressure of 34 inches of water column (about 1.22 p.s.i.).

The above process has proven satisfactory in maintaining sufficient residual heat in the thin bent glass sheets to obtain a quality temper therein while preserving the shape thereof. By way of example, a trial run of 122 finished glazing closures were produced in accordance with the above preferred process and all satisfactorily met the breakage pattern requirements under automotive standards while maintaining the desired shape within acceptable tolerances dictated by automotive styling and mounting requirements.

From the foregoing, it is apparent that the objects of the invention have been fully accomplished. An improved method and apparatus is provided for bending and tempering relatively thin glass sheets having compound bends by considerably reducing draw time and the consequent heat losses occasioned thereby to retain sufficient heat within the interiors of such thin sheets for quality tempering. This reduction in draw time is effected by arranging the heating, bending and tempering sections in a compact, contiguous relation, rapidly cycling the sheet through the bending phase coupled with the elimination of a No. 2 dwell position, and high speed glass conveyance between the heating and bending sections. Also, the engagement of the hot sheet with the relatively cold male mold member sets or freezes the surface skin of such sheet sufficiently to preserve the shape thereof and minimize, if not completely eliminate, distortion and sagging otherwise imparted by the support conveyor rolls when deposited thereon.

It is to be understood that the form of the invention herewith shown and described is to be taken as an illustrative embodiment of the same and that various changes in the shape, size and arrangement of parts, as well as various procedural changes, may be resorted to without departing from the spirit of the invention.

We claim:

1. A method of bending and tempering relatively thin glass sheets comprising: heating a glass sheet to the softening point thereof in a furnace, transferring said heated sheet from said furnace onto a shaping surface of a press member, moving said press member toward a complemental shaping surface of a second press member to press said sheet therebetween and impart the desired curvature to said sheet, removing said sheet from between said press members and advancing said sheet to a primary tempering section immediately downstream from said press members, advancing said sheet through said primary tempering section while applying a cooling fluid at a rapid flow rate through a multiplicity of small diameter orifices under relatively high pressure but of relatively small volume against the opposite surfaces of said sheet to initiate tempering by creating a maximum temperature differential between the opposite surfaces of the glass sheet and the core thereof and maintaining said maximum temperature differential until said core of the sheet passes through the strain point of the glass, advancing said sheet from said primary tempering section to and through a secondary tempering section immediately downstream of said primary tempering section while applying a cooling fluid under relatively low pressure but of a relatively large volume against the opposite surfaces of said sheet to complete the tempering thereof.

2. A method according to claim 1, including moving said sheet through said heating chamber at a first preselected rate of speed and rapidly advancing said sheet out of said heating chamber to the region of said first mentioned press member at a second rate of speed substantially greater than said first rate of speed.

3. A method according to claim 1, wherein the pressure of said high pressure cooling fluid ranges from about 5 to 11 p.s.i. and the pressure of said low pressure cooling fluid ranges from about 1.2 to 1.5 p.s.i.

4. Apparatus for bending and tempering relatively thin glass sheets comprising: a conveyor for supporting and moving a thin glass sheet along a substantially horizontal path through a heating chamber, a bending area, and a tempering area including a primary tempering section and a secondary tempering section; means in said heating chamber for heating the sheet to substantially the softening point of glass; opposed press members mounted in said bending area for press shaping said heated sheet into the desired curvature; said press members located immediately adjacent the exit end of said heating chamber in a substantially juxtaposed relation thereto; said primary tempering section being mounted immediately downstream of said press members in substantially juxtaposed relation thereto and including a multiplicity of relatively small diameter orifices for directing a plurality of streams of cooling fluid under relatively high pressure but of relatively small volume against the opposite surfaces of said bent sheet to initiate rapid chilling and tempering of the same while minimizing blow back into the bending area; said secondary tempering section located immediately downstream of said primary tempering section and including relatively large diameter orifices for directing a plurality of streams of cooling fluid under relatively low pressure but of relatively large volume against the opposite surfaces of said sheet to complete the tempering thereof.

5. Apparatus according to claim 4, wherein said conveyor is operative at differential speeds to move said sheet through said heating chamber at a preselected first rate of speed and rapidly advance said sheet out of said heating chamber and into said bending area at a rate of speed greater than said first rate of speed.

6. A method according to claim 1, wherein the elapsed time between the heating and high pressure cooling of said sheet is no greater than 4 seconds.

7. A method according to claim 1, wherein the elapsed time between the heating and high pressure cooling of said sheet is about 3.5 seconds.

8. A method according to claim 2, wherein said first preselected speed ranges from about 180 to 280 inches per minute and said second rate of speed ranges from about 1400 to 1550 inches per minute.

* * * * *